United States Patent
Ito

(10) Patent No.: US 11,898,124 B2
(45) Date of Patent: Feb. 13, 2024

(54) CLEANER COMPOSITION, CLEANING AEROSOL, AND METHOD FOR CLEANING CONTAMINATED PART

(71) Applicant: THREEBOND CO., LTD., Tokyo (JP)

(72) Inventor: Hiroaki Ito, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 731 days.

(21) Appl. No.: 17/049,712

(22) PCT Filed: Mar. 15, 2019

(86) PCT No.: PCT/JP2019/010954
§ 371 (c)(1),
(2) Date: Oct. 22, 2020

(87) PCT Pub. No.: WO2019/208019
PCT Pub. Date: Oct. 31, 2019

(65) Prior Publication Data
US 2021/0238506 A1 Aug. 5, 2021

(30) Foreign Application Priority Data

Apr. 27, 2018 (JP) ................. 2018-087104

(51) Int. Cl.
| C11D 3/16 | (2006.01) |
| C11D 3/24 | (2006.01) |
| C11D 3/44 | (2006.01) |
| C11D 7/50 | (2006.01) |
| B08B 3/08 | (2006.01) |
| C11D 11/00 | (2006.01) |
| C11D 17/00 | (2006.01) |
| C23G 5/028 | (2006.01) |
| C11D 7/28 | (2006.01) |
| C11D 7/30 | (2006.01) |

(52) U.S. Cl.
CPC .............. *C11D 7/5018* (2013.01); *B08B 3/08* (2013.01); *C11D 7/28* (2013.01); *C11D 7/30* (2013.01); *C11D 7/50* (2013.01); *C11D 7/5004* (2013.01); *C11D 11/0041* (2013.01); *C11D 17/0043* (2013.01); *C23G 5/02803* (2013.01); *C23G 5/02812* (2013.01)

(58) Field of Classification Search
CPC .... C11D 7/28; C11D 7/30; C11D 7/50; C11D 7/5004; B08B 3/05; B08B 3/10

USPC ..... 510/184, 185, 238, 408, 415; 134/39, 40
See application file for complete search history.

(56) References Cited

U.S. PATENT DOCUMENTS

| 2011/0124758 A1* | 5/2011 | Loh ................ C08G 18/092 521/131 |
| 2014/0070129 A1 | 3/2014 | Kennoy et al. |
| 2015/0290686 A1 | 10/2015 | Basu et al. |
| 2018/0127341 A1 | 5/2018 | Nakamura et al. |
| 2018/0250607 A1 | 9/2018 | Singh |
| 2020/0017979 A1 | 1/2020 | Miyaoka et al. |

FOREIGN PATENT DOCUMENTS

| EP | 2712907 A1 | 4/2014 |
| JP | 2010-248443 A | 11/2010 |
| JP | 2011-510119 A | 3/2011 |
| JP | 2014-523928 A | 9/2014 |
| JP | 2017-043742 A | 3/2017 |
| JP | 2017-110225 A | 6/2017 |
| JP | 2017-513711 A | 6/2017 |
| JP | 2017-200989 A | 11/2017 |
| WO | 2017/122803 A1 | 7/2017 |
| WO | 2019/093350 A1 | 5/2019 |

OTHER PUBLICATIONS

EPO, Extended European Search Report for the corresponding European patent application No. 19793263.5, dated Jan. 5, 2022.
CNIPA, Office Action for the corresponding Chinese patent application No. 201980025064.8, dated Jul. 5, 2021, with English translation.
PCT, International Search Report for the corresponding patent application No. PCT/JP2019/010954, dated Jun. 11, 2019, with English translation.

* cited by examiner

*Primary Examiner* — Gregory R Delcotto
(74) *Attorney, Agent, or Firm* — LUCAS & MERCANTI, LLP

(57) ABSTRACT

The present invention provides a cleaner composition having excellent cleaning properties and appropriate drying properties. The present invention is a cleaner composition including: (A) a hydrofluoroolefin having a boiling point of 30° C. or more and less than 100° C.; and (B) at least one of a perfluoropolyether having a boiling point of 100° C. or more and a hydrofluoroolefin having a boiling point of 100° C. or more, where a mass ratio of the component (A) and the component (B) is 99:1 to 55:45.

10 Claims, No Drawings

CLEANER COMPOSITION, CLEANING AEROSOL, AND METHOD FOR CLEANING CONTAMINATED PART

CROSS REFERENCE TO RELATED APPLICATION

This Application is a 371 of PCT/JP2019/010954 filed on Mar. 15, 2019 which, in turn, claimed the priority of Japanese Patent Application No. 2018-087104 filed on Apr. 27, 2018, both applications are incorporated herein by reference.

TECHNICAL FIELD

The present invention relates to a cleaner composition, a cleaning aerosol obtained by filling of the cleaner composition, and a method for cleaning a contaminated part using the cleaning aerosol.

BACKGROUND ART

Conventionally, cleaning agents for cleaning industrial parts have been used for cleaning greases attached to the surfaces of industrial machines, transports, electrical and electronic equipment, building materials, or the like. Particularly, grease for lubrication, cooling or the like is attached to each of driving portions and sliding portions of transports such as automobiles, trains, tractors, ships, airplanes, and forklifts. The surface thereof is contaminated due to the scattering of the grease due to driving, attachment of contaminants which are present in the surrounding environment during driving, and the like. Cleaning agents containing petroleum-based hydrocarbons and alcohols have been used to remove such contamination. However, these solvents are highly flammable, and therefore, they are dangerous substances under the Fire Defense Law. In the case of falling under the category of dangerous substances, it will be necessary to install and manage a dangerous goods warehouse, and it will be costly to install and maintain it. Therefore, a non-flammable (non-hazardous) cleaning agent has been desired (JP 2014-523928 A (corresponding to US 2014/070129 A). Further, in recent years, from the viewpoint of environmental impact, cleaner compositions obtained by using a fluorine-based solvent having a low ozone depletion potential (ODP) and a low global warming potential (GWP) have been proposed. Among them, 1-chloro-3,3,3-trifluoropropene exhibits excellent cleaning properties and is therefore widely used as a non-flammable cleaning agent (JP 2010-248443 A, JP 2017-200989 A, JP 2017-043742 A, and JP 2017-110225 A (corresponding to US 2018/250607 A)).

SUMMARY OF INVENTION

However, the boiling points of trans form and cis form of 1-chloro-3,3,3-trifluoropropene are as low as 19° C. and 39° C., respectively. Accordingly, a drying rate of a cleaning agent prepared by using the compound is too fast during the work in summer or a place where the temperature is high, and thus the cleaning agent dries before the dirt to be removed is completely removed. As a result, there has been a problem that an excessive amount of the cleaning agent has to be used, the work time is significantly increased, and the productivity is reduced. Consequently, in order to improve workability in a high temperature environment such as in summer, a cleaner composition having appropriate drying properties is desired.

Therefore, an object of the present invention is to provide a cleaner composition having excellent cleaning properties and appropriate drying properties.

As a result of intensive studies, the present inventors have found that the above-described problems can be solved by the following configurations, and completed the present invention.

Next, embodiments of the present invention are described:

[1] A cleaner composition including: (A) a hydrofluoroolefin having a boiling point of 30° C. or more and less than 100° C.; and (B) at least one of a perfluoropolyether having a boiling point of 100° C. or more and a hydrofluoroolefin having a boiling point of 100° C. or more, where a mass ratio of the component (A) and the component (B) is 99:1 to 55:45.

[2] The cleaner composition according to [1], where a boiling point of the component (A) is 30° C. or more and less than 90° C.

[3] The cleaner composition according to [1] or [2], where a boiling point of the component (B) is 100° C. or more and less than 150° C.

[4] The cleaner composition according to any one of [1] to [3], where the component (B) is at least one of methoxyperfluoroheptene and a perfluoropolyether having a boiling point of 100° C. or more.

[5] The cleaner composition according to any one of [1] to [4], where the component (A) has one or more chlorine atoms in its molecule.

[6] The cleaner composition according to any one of [1] to [5], where the component (A) is cis-1-chloro-3,3,3-trifluoropropene.

[7] A cleaning aerosol obtained by filling a pressure-resistant container with the cleaner composition according to any one of [1] to [6].

[8] A method for cleaning a contaminated part, including injecting the cleaning aerosol according to [7] onto a contaminant attached to the contaminated part.

[9] The method for cleaning a contaminated part according to [8], where the contaminated part is a brake part.

[10] The method for cleaning a contaminated part according to [9], where the brake part is an automobile part.

DESCRIPTION OF EMBODIMENTS

Embodiments of the present invention are described hereinbelow. The present invention is not limited only to the following embodiments. Further, unless otherwise indicated, operations and measurements of physical properties and the like are carried out under conditions of room temperature (in a range of 20 to 25° C.) and relative humidity of 40 to 50% RH. Furthermore, in the present specification, the expression "X to Y" showing a range represents "X or more and Y or less".

<Cleaner Composition>

One embodiment of the present invention is a cleaner composition including: (A) hydrofluoroolefin having a boiling point of 30° C. or more and less than 100° C.; and (B) at least one of perfluoropolyether having a boiling point of 100° C. or more and hydrofluoroolefin having a boiling point of 100° C. or more, where a mass ratio of the component (A) and the component (B) is 99:1 to 55:45. The cleaner composition has excellent cleaning properties and appropriate drying properties. Further, the aerosol obtained by filling of the cleaner composition has good injection properties. In addition, the cleaner composition is non-flammable. Therefore, according to the cleaner composition, the industrial parts can be cleaned easily, safely, and with high efficiency even in a high temperature environment such as in summer, whereby the productivity of the industrial parts can be improved.

[Component (A)]

The component (A) contained in the cleaner composition of the present invention is a hydrofluoroolefin having a boiling point of 30° C. or more and less than 100° C., and is a main component that exerts a cleansing action on contaminants. In this specification, the hydrofluoroolefin is a fluorine-based compound having a carbon atom, a hydrogen atom, and a fluorine atom and having an unsaturated bond (specifically, a carbon-carbon double bond) in the molecule.

The boiling point of the component (A) is 30° C. or more and less than 100° C. In the case of using a hydrofluoroolefin having a boiling point of less than 30° C. in place of the component (A), the workability in a high temperature environment is poor because the drying rate is too fast even when combined with the component (B) below. On the other hand, in the case of using a hydrofluoroolefin having a boiling point of 100° C. or more (i.e., the component (B)) in place of the component (A), the cleaning properties are impaired. The boiling point of the component (A) is preferably 30° C. or more and less than 95° C., more preferably 30° C. or more and less than 90° C., still more preferably 35° C. or more and less than 80° C., and yet still more preferably 35° C. or more and less than 70° C., and particularly preferably 35° C. or more and less than 60° C. The component (A) having a boiling point within the above range is mixed with the component (B), so that it is possible to obtain a cleaner composition in which appropriate drying properties and good cleaning properties are achieved at a higher level.

The component (A) is preferably a hydrofluoroolefin having one or more chlorine atoms in its molecule. When such a compound is used as the component (A), the cleaning properties are further improved. Further, the compound has an unsaturated bond and a chlorine atom in its molecule, which causes the compound to easily dissolve in the air, so the ozone depletion potential (ODP) and the global warming potential (GWP) are extremely small, and the impact on the environment can be reduced. In this specification, the "ozone depletion potential" is a value used in comparison of the strength of ozone depletion calculated by dividing the total amount of ozone depletion per kg of each compound by the total amount of ozone depletion per kg of trichlorofluoromethane. Further, the "global warming potential" is an index that relatively shows the effect on global warming of each greenhouse gas with respect to carbon dioxide after considering the duration of the effect.

The ozone depletion potential of the component (A) is preferably 20 or less, more preferably 10 or less, and most preferably 5 or less (lower limit: 0). Further, the global warming potential of the component (A) is preferably 10 or less, more preferably 7 or less, and most preferably 5 or less (lower limit: 0).

Examples of the hydrofluoroolefin having one or more chlorine atoms in its molecule include $CF_3CH=CClH$ (1-chloro-3,3,3-trifluoropropene), $CHF_2CF=CClH$, $CHF_2CH=CClF$, $CHF_2CCl=CHF$, $CH_2FCCl=CF_2$, $CHFClCF=CFH$, $CH_2ClCF=CF_2$, $CF_3CCl=CH_2$, and the like. Among them, 1-chloro-3,3,3-trifluoropropene is preferable, and cis-1-chloro-3,3,3-trifluoropropene is more preferable, from the viewpoint of further improving the effect of the present invention.

The kauri-butanol (KB) value of the component (A) is preferably 10 or more, more preferably 20 or more, and still more preferably 30 or more. When the KB value is or more, excellent cleaning performance against contaminants can be exerted. The Kauri-butanol value is an index showing a grease saturation power of a sample. The larger the numerical value, the more grease can be dissolved by the sample. The method described in ASTM D1133 can be used as a method for measuring the kauri-butanol (KB) value. The KB value refers to the number of milliliters of a sample when a certain amount of a solution of a kauri resin in butanol is poured into a flask, the flask is placed on printing type paper, the sample is dropped to the flask, and a piece of printing type becomes unreadable due to the occurrence of turbidity.

In the present invention, a known commercial product can be used as the component (A). Examples of the commercial product include SOLVIA (registered trademark) manufactured by SOLVEX INC., AMOLEA (registered trademark) AS-300 manufactured by ASAHI GLASS CO., LTD., S11 and S12 manufactured by DAIKIN INDUSTRIES, LTD., and the like. These commercial products have one or more chlorine atoms in the molecule.

The component (A) may be used singly, or in combination of two or more kinds thereof. In the case of being used in combination of two or more kinds thereof, the characteristics (cleaning properties, drying properties, or the like) of the cleaner composition can be easily adjusted.

[Component (B)]

The component (B) contained in the cleaner composition of the present invention is at least one of a perfluoropolyether having a boiling point of 100° C. or more (hereinafter also referred to as "component (B-1)") and a hydrofluoroolefin having a boiling point of 100° C. or more (hereinafter also referred to as "component (B-2)"). The component (B-1) may be used singly, or in combination of two or more kinds thereof. Further, the component (B-2) may be used singly, or in combination of two or more kinds thereof.

When the component (B) is mixed with the component (A), it is possible to obtain a cleaner composition having excellent cleaning properties and appropriate drying properties. In this specification, the perfluoropolyether is a compound in which all hydrogen atoms are substituted with fluorine atoms in a hydrocarbon compound having two or more ether bonds. On the other hand, in the case of using a hydrofluoroether having a similar boiling point (a compound in which some hydrogen atoms are substituted with fluorine atoms in a hydrocarbon compound having an ether bond) in place of the component (B), the cleaning properties are poor (Comparative Example 2 below).

The boiling point of the component (B) is 100° C. or more. In the case of using a perfluoropolyether having a boiling point of less than 100° C. in place of the component (B), the drying rate is fast and the workability in a high temperature environment is poor (Comparative Example 6 below). From the viewpoint of further improving the effect of the present invention, the boiling point of the component (B) is preferably 100° C. or more and less than 200° C., more preferably 100° C. or more and less than 170° C., and still more preferably 100° C. or more and less than 150° C., and particularly preferably 105° C. or more and less than 140° C.

The hydrofluoroolefin as the component (B) is preferably an alkoxyperfluoroalkene, and examples thereof include methoxyperfluoroalkenes such as methoxyperfluoroheptene and methoxyperfluorooctene; ethoxyperfluoroalkenes such as ethoxyperfluoroheptene, and ethoxyperfluorooctene; and the like. Among them, methoxyperfluoroalkene is more preferable, and methoxyperfluoroheptene is particularly preferable, from the viewpoint of cleaning properties.

Therefore, in one embodiment of the present invention, the component (B) is at least one of methoxyperfluoroheptene and a perfluoropolyether having a boiling point of 100° C. or more.

As the component (B), one having an ozone depletion potential of 10 or less is preferable from the viewpoint of environmental impact. The ozone depletion potential is more preferably 7 or less, and most preferably 5 or less (lower limit: 0).

In the present invention, a known commercial product can be used as the component (B). Examples of commercial products of perfluoropolyether having a boiling point of 100° C. or more include Galden (registered trademark) SV110, SV135, and the like (manufactured by Solvay Japan, Ltd.). Examples of commercial products of hydrofluoroolefin having a boiling point of 100° C. or more include Vertrel (registered trademark) Suprion (manufactured by Du Pont-Mitsui Fluorochemicals Co., Ltd.), and the like. The component (B) may be used singly, or in combination of two or more kinds thereof. In the case of being used in combination of two or more kinds thereof, the characteristics (cleaning properties, drying properties, or the like) of the cleaner composition can be easily adjusted.

The mass ratio of the component (A) and the component (B) is 99:1 to 55:45. When the mass of the component (A) is larger than 99:1, the drying rate is too fast and the workability in a high temperature environment is poor (Comparative Example 5 below). On the other hand, when the mass of the component (A) is smaller than 55:45, the cleaning properties are poor (Comparative Examples 3 and 4 below). From the viewpoint of further improving the effect of the present invention, the mass ratio of the component (A) and the component (B) is more preferably 99:1 to 70:30, still more preferably 99:1 to 80:20, yet still more preferably 99:1 to 85:15, and particularly preferably 99:1 to 90:10. In the case of using the component (B-1) in combination with the component (B-2), the mass of the component (B) represents the sum of the mass of the component (B-1) and the mass of the component (B-2).

[Optional Components]

The cleaner composition of the present invention may further contain optional components other than the component (A) and the component (B) as long as the characteristics of the present invention are not impaired. The component is not particularly limited as long as it can be uniformly dissolved or dispersed in the component (A) and the component (B), and examples thereof include a surfactant, an ultraviolet absorber, an antioxidant, a chelating agent, a rust inhibitor, a fragrance, and the like.

<Use of Cleaner Composition>

The use of the cleaner composition of the present invention is not particularly limited, and the composition is applied to cleaning by various methods such as wiping using a waste cloth or the like, dipping, ultrasonic cleaning, and spraying using an air spray or an air gun. The cleaner composition of the present invention may be a product packed as aerosol by filling a pressure-resistant container with the cleaner composition together with a propellant. As the pressure-resistant container, a conventionally known pressure-resistant container can be used. Further, a known substance can be used as the propellant. The propellant is not particularly limited, and examples thereof include dimethyl ether (DME), carbon dioxide, liquefied petroleum gas (LPG), nitrogen, nitrous oxide, isobutane, haloalkyl, hydrofluoroolefin, compressed air, and the like. Among them, hydrofluoroolefin, carbon dioxide, and nitrogen are preferable, and carbon dioxide is most preferable, from the viewpoints of easy availability, safety, environmental impact, and the like. The aerosol prepared by combining the cleaner composition of the present invention and a propellant exhibits good injection properties. Thus, industrial parts can be efficiently cleaned. Therefore, the present invention also provides a cleaning aerosol obtained by filling a pressure-resistant container with the cleaner composition. In the aerosol of the present invention, the mass ratio of the cleaner composition and the propellant is not particularly limited, and is preferably 99:1 to 80:20, and more preferably 98:2 to 90:10 from the viewpoint of achieving both cleaning properties and injection properties.

The cleaner composition of the present invention is suitable for cleaning industrial parts such as industrial machines, transportation equipment, electrical and electronic equipment, and building materials. Particularly, it is suitable for cleaning a contaminant caused by grease or the like on a surface of metal or resin in transportation equipment of an automobile, train car, or the like. More specifically, the cleaner composition of the present invention is particularly suitable for cleaning a brake device of an automobile or the like because the cleaner composition has excellent cleaning properties for dirt such as grease on a brake device of an automobile or the like. Accordingly, the present invention also provides a method for cleaning a contaminated part (preferably a brake part, more preferably an automobile brake part), including injecting the cleaning aerosol onto a contaminant attached to the contaminated part (preferably a brake part, more preferably an automobile brake part). The cleaner composition of the present invention is also suitable for cleaning other machines. Further, the cleaner composition of the present invention may be used for cleaning a nonmetallic material such as a resin or a fiber. Further, the cleaner composition of the present invention can be applied to applications other than cleaning which are required to dissolve contaminants (i.e., greases and solidified products), for example, removal of pressure sensitive adhesives, adhesives, and the like.

EXAMPLES

Subsequently, the present invention is described in more detail with reference to Examples, however the present invention is not limited to these Examples.

The following components were prepared for preparing a cleaner composition.

Component (A): Hydrofluoroolefin Having a Boiling Point of 30° C. or More and Less than 100° C.

- Cis-1-chloro-3,3,3-trifluoropropene: trade name SOLVIA (registered trademark) (manufactured by SOLVEX INC.), having a boiling point of 39° C., a KB value of 34, an ozone depletion potential of 0, and a global warming potential of 5 or less
- Trade name: AMOLEA (registered trademark) AS-300 (manufactured by ASAHI GLASS CO., LTD.) having a boiling point of 54° C., a KB value of 44, an ozone depletion potential of 0, and a global warming potential of 5 or less
- Trade name S11 (manufactured by DAIKIN INDUSTRIES, LTD.) having a boiling point of 58° C., a KB value of 50, an ozone depletion potential of 0, and a global warming potential of 5 or less Component (B): perfluoropolyether having a boiling point of 100° C. or more Trade name: Galden (registered trademark) SV110 (manufactured by Solvay Japan, Ltd.) having a boiling point of 110° C. and an ozone depletion potential of 0

Trade name: Galden (registered trademark) SV135 (manufactured by Solvay Japan, Ltd.) having a boiling point of 135° C. and an ozone depletion potential of 0

Component (B): Hydrofluoroolefin Having a Boiling Point of 100° C. or More

Methoxyperfluoroheptene, trade name: Vertrel (registered trademark) Suprion (Du Pont-Mitsui Fluorochemicals Co., Ltd.) having a boiling point of 110.5° C. and an ozone depletion potential of 0

Component (B)': Hydrofluoroether

Trade name: Novec (registered trademark) 7100 (manufactured by 3M Japan Limited) having a boiling point of 61° C. and an ozone depletion potential of 0

Trade name: Novec (registered trademark) 7200 (manufactured by 3M Japan Limited) having a boiling point of 76° C. and an ozone depletion potential of 0

Trade name: Novec (registered trademark) 7300 (manufactured by 3M Japan Limited) having a boiling point of 98° C. and an ozone depletion potential of 0

Component (B)': Perfluoropolyether Having a Boiling Point of Less than 100° C.

Trade name: Galden (registered trademark) SV80 (manufactured by Solvay Japan, Ltd.) having a boiling point of 80° C.

The component (A) and the component (B) or the component (B)' were weighed in a 200 mL polycup so that the total amount was 100 g, and the mixture was stirred with a three-one motor for 3 minutes to prepare a cleaner composition. Detailed preparation amounts are in accordance with Table 1, and all numerical values are expressed in parts by mass. Each test was conducted in a temperature-controlled room set to each temperature (25° C. or 40° C.)

[Evaluation of Cleaning Properties]

10 g of each cleaner composition adjusted to 25° C. or 40° C. was weighed in a 20 mL vial container, 0.05 g of each of the following greases was added. The container was sealed, and then the mixture was shaken by hand 30 times. Thereafter, the mixture was allowed to stand for 5 minutes, and the compatibility between each grease in the liquid and the cleaning agent was visually confirmed. Note that each grease used in the evaluation is described below.

Engine oil: Castrol Engine Oil 0W-20SN grade, manufactured by BP Japan KK

Mineral oil grease: ThreeBond 1815D, manufactured by ThreeBond Co., Ltd.

Chemical synthetic oil: Castrol EDGE 0W-40 SN/CF grade, manufactured by BP Japan KK Gear oil: Toyota Gear Oil Special GL-3 grade 75W-90

Brake fluid: Toyota Brake Fluid 2500

Silicone oil: Toray Industries, Inc.

DOW CORNING TORAY SH200 FLUID 1000CST, manufactured by Toray Dow Corning Corporation.

<Evaluation Criteria>

If the compatibility with respective greases is good, it is possible to dissolve the greases and perform well cleaning. Thus, the cleaning properties were evaluated based on the following criteria:

⊙: the mixture is well mixed without being cloudy=the dirt is easily cleaned;

○: the mixture becomes cloudy=it takes a time, but the dirt is cleaned;

x: the mixture is partially separated=some dirt remains; and xx: the mixture is separated=the dirt is not cleaned at all.

[Evaluation of Drying Properties]

A 20 ml vial container containing each cleaner composition and a SUS plate (70×150×0.8 mm) whose surface had been washed with toluene were allowed to stand in a temperature-controlled room at 40° C. for 1 hour. 0.1 ml of each cleaner composition allowed to stand in the temperature-controlled room at 40° C. was dispensed with a dropper and dropped on the SUS plate. The dropped cleaner composition was visually observed and the time until the droplets volatilized and disappeared was measured. If the time was 25 seconds or longer, it was judged to be acceptable. In consideration of the process time, the drying time is preferably 100 seconds or less. Note that, in Table 1-2 below, "–" indicates that no evaluation is conducted.

TABLE 1-1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| (A) | SOLVIA | | 90 | | | 90 | 90 | 99 | 99 | 99 | 55 | 55 | 55 |
| | AMOLEA AS-300 | | | 90 | | | | | | | | | |
| | S11 | | | | 90 | | | | | | | | |
| (B) | Galden SV110 | | 10 | 10 | 10 | | | 1 | | | 45 | | |
| | Galden SV135 | | | | | 10 | | | 1 | | | 45 | |
| | Vertrel Suprion | | | | | | 10 | | | 1 | | | 45 |
| Cleaning properties | Engine oil | 25° C. | ⊙ | ⊙ | ⊙ | ⊙ | ⊙ | ⊙ | ⊙ | ⊙ | ○ | ○ | ○ |
| | Mineral oil grease | | ⊙ | ⊙ | ⊙ | ⊙ | ⊙ | ⊙ | ⊙ | ⊙ | ○ | ○ | ○ |
| | Chemical synthetic oil | | ⊙ | ⊙ | ⊙ | ⊙ | ⊙ | ⊙ | ⊙ | ⊙ | ○ | ○ | ○ |
| | Engine oil | 40° C. | ⊙ | ⊙ | ⊙ | ⊙ | ⊙ | ⊙ | ⊙ | ⊙ | ○ | ○ | ○ |
| | Gear oil | | ⊙ | ⊙ | ⊙ | ⊙ | ⊙ | ⊙ | ⊙ | ⊙ | ○ | ○ | ○ |
| | Brake fluid | | ⊙ | ⊙ | ⊙ | ⊙ | ⊙ | ⊙ | ⊙ | ⊙ | ○ | ○ | ○ |
| | Mineral oil grease | | ⊙ | ⊙ | ⊙ | ⊙ | ⊙ | ⊙ | ⊙ | ⊙ | ○ | ○ | ○ |
| | Chemical synthetic oil | | ⊙ | ⊙ | ⊙ | ⊙ | ⊙ | ⊙ | ⊙ | ⊙ | ○ | ○ | ○ |
| | Silicone oil | | ⊙ | ⊙ | ⊙ | ⊙ | ⊙ | ⊙ | ⊙ | ⊙ | ○ | ○ | ○ |
| | Drying properties (sec.) | | 41 | 41 | 45 | 45 | 35 | 27 | 36 | 28 | 120 | 158 | 142 |

TABLE 1-2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| (A) | SOLVIA AMOLEA AS-300 S11 | 90 | 90 | 50 | 50 | 100 | 90 | 90 |
| (B) | Galden SV110 | | | | | | | |
| | Galden SV135 | | | 50 | | | | |
| | Vertrel Suprion | | | | 50 | | | |
| (B)' | Novec 7200 | 10 | | | | | | |
| | Novec 7300 | | 10 | | | | | |
| | Galden SV80 | | | | | | 10 | |
| | Novec 7100 | | | | | | | 10 |
| Cleaning properties | Engine oil 25° C. | XX | XX | X | X | ○ | X | ○ |
| | Mineral oil grease | XX | XX | X | X | ○ | ○ | ○ |
| | Chemical synthetic oil | XX | XX | X | X | ○ | ○ | ○ |
| | Drying properties (sec.) | 13 | 30 | — | — | 11 | 23 | 19 |

As shown in Table 1-1, it was found that the cleaner composition according to the present invention (Examples 1 to 11) had excellent cleaning properties and appropriate drying properties. Especially, it is found that, according to the cleaner compositions (Examples 1 to 8) in which the mass ratio of the component (A) and the component (B) is 99:1 or 90:10, both excellent cleaning properties and appropriate drying properties can be achieved at a higher level, as compared to the cleaner compositions (Examples 9 to 11) in which the mass ratio of the component (A) and the component (B) is 55:45.

On the other hand, as shown in Table 1-2, the cleaner compositions produced by using a hydrofluoroether in place of the component (B) (Comparative Examples 1, 2, and 7) had poor cleaning properties or the drying rate was too fast. Therefore, the effect of the present invention was not obtained. Further, the cleaner compositions in which the mass ratio of the component (A) and the component (B) were out of the range of the present invention (Comparative Examples 3 and 4) resulted in poor cleaning properties. Furthermore, the drying rate of the cleaner composition not containing the component (B) (Comparative Example 5), or the cleaner composition produced by using a perfluoropolyether having a boiling point of less than 100° C. instead of the component (B) (Comparative Example 6) was too fast, which resulted in poor workability in a high temperature environment.

[Evaluation of Aerosol/Injection Pressure]

A predetermined mass of each of the cleaner compositions of Examples 1, 2, and 5 and a propellant (carbon dioxide) was filled to prepare a test aerosol. A pressure gauge (product number AU100, manufactured by Ebara Gauge Mfg. Co., Ltd.) was inserted into an actuator portion of each aerosol and the pressure in an initial state of the aerosol container (injection pressure) was measured. From the viewpoint of physically exerting a cleaning effect, 0.4 MPa or more was judged to be acceptable.

[Evaluation of Aerosol/Injection Pattern]

The same aerosol as described above with an injection button attached was injected toward a SUS flat plate at a distance of 30 cm, and the injection pattern at that time was observed visually.

One in which mist was widely diffused and sprayed on a flat plate was judged to be acceptable.

TABLE 2

| | | Example 1 | Example 2 | Example 3 |
|---|---|---|---|---|
| (A) | SOLVIA AMOLEA AS-300 | 85.5 | 85.5 | 85.5 |
| (B) | Galden SV110 | 9.5 | 9.5 | |
| | Vertrel Suprion | | | 9.5 |
| Propellant | Carbon dioxide | 5 | 5 | 5 |
| Aerosol characteristics | Injection pressure | 0.6 | 0.6 | 0.6 |
| | Injection pattern | Widely diffused (acceptable) | Widely diffused (acceptable) | Widely diffused (acceptable) |

As shown in Table 2, in the aerosol filled with the cleaner composition of the present invention, the injection pressure was stable and the injection pattern was good. Therefore, it is considered that the performance of the cleaner composition of the present invention when filled in aerosol can remove and clean contaminants.

INDUSTRIAL APPLICABILITY

The cleaner composition of the present invention is suitable for cleaning a contaminated part such as industrial machine parts, transport equipment parts, electrical and electronic parts, civil engineering, construction, and structural materials, particularly a contaminated site in which a grease content and a solidified product are attached to a part around an automobile brake or the like. Even in a high temperature environment, such as in summer or in a place where the temperature is high, the contaminated site can be cleaned easily, safely, and with high efficiency and minimal environmental impact by using the cleaner composition of the present invention, and thus the cleaner composition is very useful.

This application is based on Japanese Patent Application No. 2018-87104 filed on Apr. 27, 2018, the disclosure of which is incorporated by reference in its entirety.

The invention claimed is:

1. A cleaner composition comprising:
    (A) a hydrofluoroolefin having a boiling point of 30° C. or more and less than 100° C.; and
    (B) at least one of a perfluoropolyether having a boiling point of 100° C. or more,
    wherein a mass ratio of the component (A) and the component (B) is 99:1 to 55:45.
2. The cleaner composition according to claim 1, wherein a boiling point of the component (A) is 30° C. or more and less than 90° C.

3. The cleaner composition according to claim 1, wherein a boiling point of the component (B) is 100° C. or more and less than 150° C.

4. The cleaner composition according to claim 1, wherein the component (A) has one or more chlorine atoms in its molecule.

5. The cleaner composition according to claim 1, wherein the component (A) is cis-1-chloro-3,3,3-trifluoropropene.

6. A cleaning aerosol obtained by filling a pressure-resistant container with the cleaner composition according to claim 1.

7. A method for cleaning a contaminated part, comprising injecting the cleaning aerosol according to claim 6 onto a contaminant attached to the contaminated part.

8. The method for cleaning a contaminated part according to claim 7, wherein the contaminated part is a brake part.

9. The method for cleaning a contaminated part according to claim 8, wherein the brake part is an automobile part.

10. The cleaner composition according to claim 1, wherein the component (A) is at least one selected from the group consisting of $CF_3CH=CClH$, $CHF_2CF=CClH$, $CHF_2CH=CClF$, $CHF_2CCl=CHF$, $CH_2FCCl=CF_2$, $CHFClCF=CFH$, $CH_2ClCF=CF_2$ and $CF_3CCl=CH_2$.

* * * * *